(12) United States Patent
Huisken

(10) Patent No.: US 6,483,456 B2
(45) Date of Patent: Nov. 19, 2002

(54) GPS RECEIVER

(75) Inventor: Josephus Antonius Huisken, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/855,581

(22) Filed: May 15, 2001

(65) Prior Publication Data

US 2002/0003494 A1 Jan. 10, 2002

(30) Foreign Application Priority Data

May 22, 2000 (EP) .............................................. 00201800

(51) Int. Cl.$^7$ .............................. G01S 5/02; H04B 7/185
(52) U.S. Cl. .................................. 342/357.06; 701/213
(58) Field of Search ...................... 342/357.06; 701/213

(56) References Cited

U.S. PATENT DOCUMENTS 5,689,245 A 11/1997 Noreen et al. .............. 340/825
6,282,491 B1 * 8/2001 Bochmann et al. ......... 701/209
6,332,070 B1 * 12/2001 Bochmann et al. ........ 455/12.1

FOREIGN PATENT DOCUMENTS

EP 1039311 A1 2/2000

* cited by examiner

Primary Examiner—Theodore M. Blum
(74) Attorney, Agent, or Firm—Edward W. Goodman

(57) ABSTRACT

Global Position System (GPS) receiver for receiving and processing GPS signals includes cicuitry for receiving and processing Digital Audio Broadcast (DAB) signals. To realize simultaneous processing of both DAB and GPS signals, the receiver is provided with a receiver front-end, a mixer stage, filter, and analog-to-digital converter coupled to digital DAB and GPS signal paths. The receiver further includes a DAB signal eliminating device for selectively eliminating DAB signals from the digital GPS signal path.

6 Claims, 3 Drawing Sheets

GPS RECEIVER

BACKGROUND OF THE INVENTION

1. Field of the Invention

The invention relates to a Global Position System (GPS) receiver for receiving and processing GPS signals comprising means for receiving and processing Digital Audio Broadcast (DAB) signals.

2. Description of the Related Art

Such a receiver is known from e.g., the article "Mobile Satellite Communications for Consumers" by Mr. G. K. Noreen, published in Microwave Journal, November, 1991, pages 24–34. The known receiver shows the use of a DAB receiver and a GPS receiver in one receiver housing. The advantages of having both single-to-multipoint transmission capabilities and position information at hand are extensively explained therein.

However, the use of complete receivers for DAB and GPS signals in one housing is not only costly, but may also give rise to mutual interferences in the processing of the received DAB and GPS signals.

SUMMARY OF THE INVENTION

It is an object of the invention to reduce the costs of implementing such receiver while maintaining, or even improving, performance of both DAB and GPS features. Therefore, a GPS receiver for receiving and processing GPS signals comprising means for receiving and processing Digital Audio Broadcast (DAB) signals, according to the invention is characterized by a receiver front end, a mixer stage, filtering means and analog-to-digital converter means being coupled to digital DAB and GPS signal paths, includes DAB signal eliminating means for selectively eliminating DAB signals from said digital GPS signal path.

The invention is based on the recognition that proper correlation of GPS signal does not necessarily require having the GPS signals available continuously or fully separated from DAB signals. This allows to either interrupt the processing of GPS signals during the data carrying signal segments of a DAB signal, hereinafter also referred to as non-zero DAB data segments, or to tolerate the occurrence of DAB signals in the GPS signal path of the receiver, therewith enabling to combine the processing of GPS signals with a processing of DAB signals and to use certain receiver circuitry in common for both GPS and DAB processing. By applying the above measure according to the invention certain RF circuitry may be used for both GPS and DAB signal processing, whereas, at least after digitization, GPS signal processing is fully separated from DAB signal processing. This allows for a reduction in the costs of implementation while preventing mutual interferences between the GPS and DAB signal processing from occurring.

Preferably a GPS receiver, according to the invention, is being characterized by a voltage-controlled oscillator supplying a tuneable local oscillator signal to the mixer stage, said DAB signal eliminating means comprising control means coupled to a DAB demodulator included in said DAB signal path and providing a control signal to the voltage-controlled oscillator as well as to a switching device, said switching device being coupled between the analog-to-digital converter means on, the one hand and, said control means tuning the receiver to receive GPS signals, and simultaneously controlling the switch to disconnect the filtering means from the GPS signal path and to connect the filtering means to the DAB signal path at the occurrence of non-zero level DAB data segments.

By applying this measure, the receiver is switched from a GPS reception mode to a DAB reception mode and vice versa, dependent of the occurrence of non-zero level data carrying segments, respectively, zero level NULL symbols, in the DAB signals, therewith allowing to use the complete receiver circuitry for the reception and processing of both DAB and GPS signals. This shared use of circuitry allows further reductions in the price of manufacturing.

Another embodiment of a GPS receiver according to the invention is characterized by the receiver front-end comprising mutually separated DAB and GPS receiver front-ends, respectively coupled to a DAB and GPS mixer stage, outputs of these DAB and GPS mixer stages being coupled through, respectively, a DAB and GPS filtering device to an adder, an output thereof being coupled to said DAB and GPS signal paths, said DAB and GPS mixer stages providing a frequency conversion of the DAB and GPS signals into mutually different frequency ranges.

By applying this measure, the selective elimination of DAB signals from said digital GPS signal path is obtained by a mutual separation in frequency. Non-zero DAB signals are therewith blocked from entering into the GPS signal path.

Preferably such embodiment is characterized by DAB channel selection means for selecting a DAB channel having a frequency range located beyond the frequency range of the GPS signals, said DAB channel selection means being controlled by a DAB channel selection control device.

This measure allows for a further suppression of DAB signals within the frequency range of the GPS signals while obtaining an improvement of the DAB channel selection.

Yet another preferred embodiment of a GPS receiver according to the invention, is characterized by signal replica means for regenerating received DAB signals from a decoded DAB signal, as well as compensation means for subtracting the regenerated DAB signals from the GPS signals in the GPS signal path.

This measure results in a feed-forward compensation of DAB signals in the GPS signal path, which with a proper adjustment in phase and amplitude of the DAB replica signal, allows to fully eliminate DAB signals from the GPS signal path.

BRIEF DESCRIPTION OF THE DRAWINGS

The invention is illustrated, by way of example and not by way of limitation, in the figures of the accompanying drawings, in which like references indicate similar elements, and in which.

DETAILED DESCRIPTION OF PREFERRED EMBODIMENTS

Figure 1:
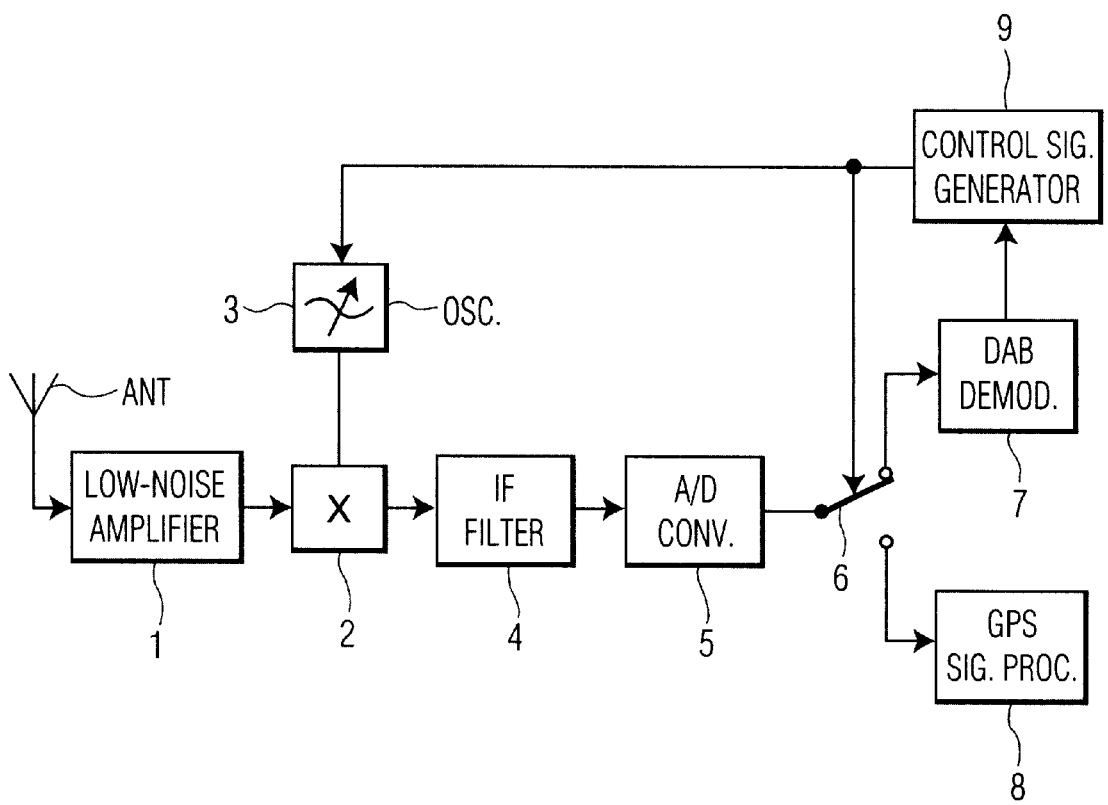
FIG. 1 is a block diagram of a first embodiment of a combined GPS/DAB receiver according to the invention.
Figure 4:
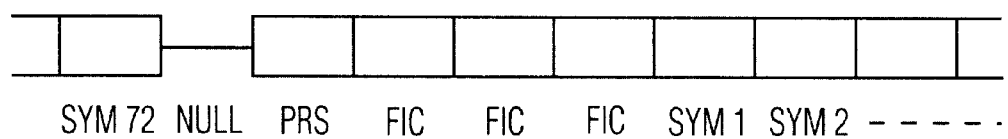
FIG. 4 shows a typical structure of a DAB signal.

FIG. 1 shows a first embodiment of a combined GPS/DAB receiver according to the invention, comprising a Global Position System (GPS) receiver 1–6, 8 for receiving and processing GPS signals, and means for receiving and processing Digital Audio Broadcast (DAB) signals 1–7 including a common receiver front-end having a low-noise amplifier (LNA) 1 being supplied with RF GPS and DAB signals from an antenna ANT and being subsequently coupled to a mixer stage 2, IF filtering means 4 and analog-to-digital (AD) converter means 5. The mixer stage 2 is being supplied with a local oscillator signal by a tuneable oscillator 3. The AD converter means 5 is coupled, through a controllable switching device 6 to either a digital DAB signal or a GPS signal path. The digital DAB and GPS signal paths include, respectively, a DAB demodulator 7 and a GPS signal processor 8. The DAB demodulator 7 is coupled to a control signal generator 9, comprising a detection device (not shown) for detecting the occurrence of so-called Null symbols, which have zero or near zero level signal energy, in the received DAB signal, as shown in FIG. 4. The circuitry described so far are, on themselves known and no further knowledge thereof is required for a proper understanding of the invention. For detailed information, reference is made to the article "A Power-Efficient Single-Chip OFDM Demodulator and Channel Decoder for Multimedia Broadcasting" by Jos A. Huisken et al, published in IEEE Journal of Solid-State Circuits, Volume 33, No. 11, November 1998.

According to the invention, the control signal generator 9 is coupled to a control input of the tunable oscillator 3 to vary the frequency of the local oscillator signal simultaneously with the controllable switching device 6. At the detection of any symbol in the demodulated DAB signal of the DAB demodulator 7, other than Null symbols, e.g., non-zero level symbols being the PRS and FIC symbols as well as symbols 1 to 72, the receiver is functioning in a DAB signal reception mode. In this DAB signal reception mode, the AD converter means 5 is coupled, through the controllable switching device 6, to the DAB demodulator 7, while the frequency of the oscillator 3 is adjusted to a value allowing the received RF DAB signals to be converted in the mixer stage into IF DAB signals having a frequency range within the pass-band of the IF filtering means 4.

At the detection of a Null symbol, the receiver is switched from the DAB reception mode into a GPS reception mode. In this GPS signal reception mode the AD converter means 5, is coupled, through the controllable switching device 6, to the GPS signal processor 8, while the frequency of the oscillator 3 is adjusted to a value allowing the received RF GPS signals to be converted in the mixer stage into IF GPS signals having a frequency range within the pass-band of the IF filtering means 4. The control signal generator 9 together with the oscillator 3 and the controllable switching device 6 therewith form DAB signal eliminating means for selectively eliminating DAB signals from said digital GPS signal path.

RF DAB signals are being received at the antenna ANT within a frequency range of 1452–1492 Mhz. The DAB channels are placed in a raster of 16 kHz. The DAB channels are separated by 1.728 Mhz. The channel at the center frequency of said frequency range is located around 1471.792 Mhz. The bandwidth of a DAB signal is 1.536 Mhz. RF GPS signals are being received at the antenna ANT within a bandwidth of 1.024 Mhz around an RF carrier frequency of 1575.42 Mhz.

These RF signals are being down-converted into DAB and GPS intermediate frequency (IF) signals in the mixer stage 2 by using a local oscillator signal of an appropriate frequency. In the DAB reception mode, the local tuneable oscillator 3 is used to provide DAB channel selection In a so-called zero IF (ZIF) receiver, the frequency of the local oscillator signal is chosen to correspond either to the RF carrier frequency of the received RF DAB signals in the DAB reception mode, or to the RF carrier frequency of the received RF GPS signals in the GPS reception mode, respectively. This results in a direct conversion of said RF signals into base-band, the IF signals so obtained also being referred to as ZIF signals. When switching such ZIF receiver between the DAB and GPS reception modes, the frequency of the local oscillator signal has to be varied between the RF carrier frequency of the RF DAB signals and the above RF carrier frequency of the RF GPS signals.

In a so-called non-zero IF (NZIF) receiver, the frequency of the local oscillator signal is chosen to differ from the RF carrier frequency of the received RF DAB signals in the DAB reception mode, or to differ from the RF carrier frequency of the received RF GPS signals in the GPS reception mode over a certain IF frequency value, which is the same in both modes. This results in a conversion of said RF signals into NZIF signals, which, in both reception modes, have a NZIF frequency corresponding with said IF frequency value. When switching such NZIF receiver between the DAB and GPS reception modes, the frequency of the local oscillator signal has to be varied between a value differing from the RF carrier frequency of the RF DAB signals over said IF frequency value, and a value differing from the RF carrier frequency of the RF GPS signals over the same IF frequency value.

In both ZIF and NZIF receiver concepts, the filtering means 4 is provided with a band-pass characteristic having a bandwidth of at least the bandwidth of the DAB signals therewith allowing use of the same for filtering means 4 for selecting both DAB and GPS IF signals.

The discontinued supply of DAB signal to the DAB demodulator 7 does not affect a continued processing of the DAB signals, because of the use of a PLL in the DAB demodulator (not shown). Such PLL, in operation, remains synchronized with the incoming DAB signals, even when the supply of DAB signals is discontinued over one or more symbols. This allows for a continuous demodulation of DAB signals. For more information about the functioning of the PLL, reference is made to the above-mentioned article "A Power-Efficient Single-Chip OFDM Demodulator and Channel Decoder for Multimedia Broadcasting" by Jos A. Huisken et al, published in IEEE Journal of Solid-State Circuits, Volume 33, No. 11, November 1998. In practice, the duration of the Null symbols is sufficiently long for a proper deconvolution of the GPS codes, needed for a reliable position determination, even when the supply of GPS signals to the GPS signal processor 8 is discontinued over the duration of the DAB symbols other than the Null symbols.

Figure 2:
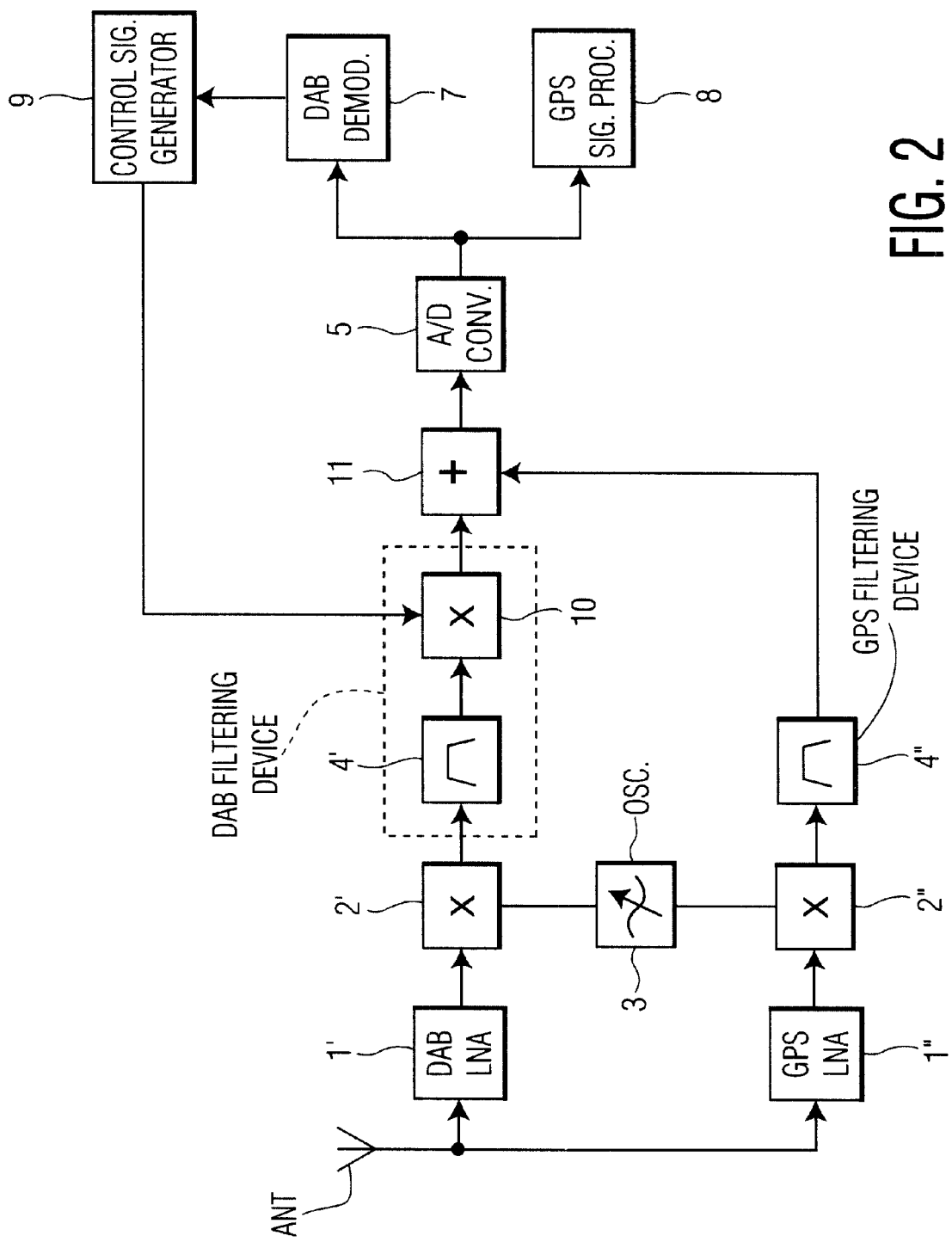
FIG. 2 is a block diagram of a second embodiment of a combined GPS/DAB receiver according to the invention.

FIG. 2 shows a block diagram of a second embodiment of a combined GPS/DAB receiver according to the invention, comprising a receiver front-end including mutually separated DAB and GPS receiver front-ends, respectively comprising DAB and GPS RF LNA's 1' and 1". The DAB and GPS RF LNA's 1' and 1" are respectively coupled to DAB and GPS mixer stages 2'and 2" and DAB and GPS filtering devices 4' and 4". The local oscillator 3 of this receiver is used to supply both DAB and GPS mixer stages 2' and 2" with an oscillator signal having a frequency chosen such that the frequency ranges of the IF converted DAB and GPS signals are in juxtaposition and located close to zero IF value. Outputs of the DAB and GPS filtering devices 4' and 4" are connected to an adder 11, an output thereof being coupled to the DAB demodulator 7 and the GPS signal processor 8 through the AD converter 5. The DAB filtering device 4' comprises a tuneable channel selection device, which may be constituted by a further mixing stage 10, and which selects a wanted DAB channel from the DAB signals available at the output of the DAB mixer stage 2'. The so selected DAB channel is separated in frequency from the GPS signal at the output of the GPS filtering device 4", therewith blocking DAB signals from passing through into the GPS signal.

In contrast with the receiver of FIG. 1, no switching occurs in the receiver shown in FIG. 2. The addition of the DAB and GPS signals obtained in the adder 11 results in a signal combination, in which the GPS signals are frequency separated from the DAB signals. The local oscillator 3 together with the filtering means 4' and 4" therewith form DAB signal eliminating means for selectively eliminating DAB signals from said digital GPS signal path. Eventually, remaining GPS signal components in the frequency range of the DAB signals effectuate only a small neglectable increase in the noise level of these DAB signals, while eventually remaining DAB signals in the frequency range of the GPS signals do not affect these GPS signals due to the fact that they are uncorrelated with the GPS signals. This allows for a proper demodulation of DAB signals in the DAB demodulator 7 and a simultaneous proper processing of GPS signals in the GPS signal processor 8. The control signal generator 9 now provides for a proper selection of a wanted DAB signal in the DAB IF filtering means 4" by supplying an appropriate oscillator signal to the further mixing stage 10 and a corresponding adjustment of the DAB demodulator.

Figure 3:
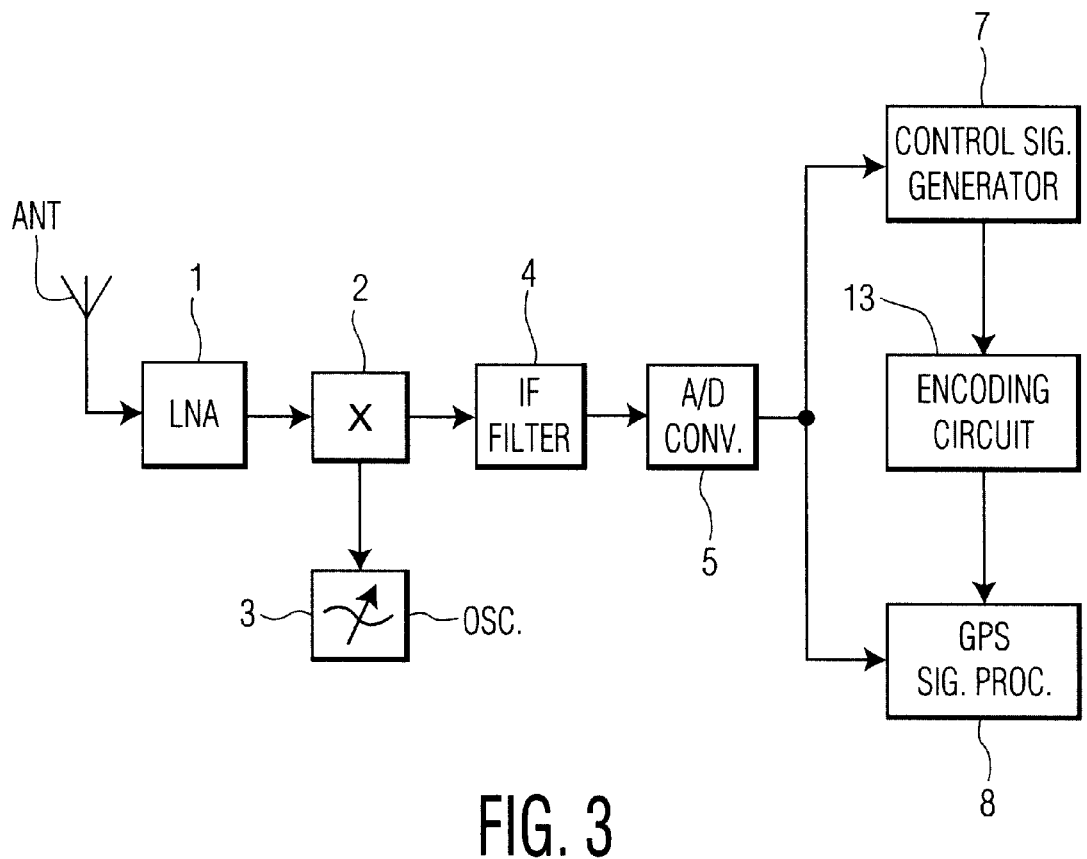
FIG. 3 is a block diagram of a third embodiment of a combined GPS/DAB receiver according to the invention.

FIG. 3 shows a third embodiment of a combined GPS/DAB receiver according to the invention, in which the frequency of the local oscillator signal 3 is chosen to provide a frequency conversion of both DAB and GPS signals to substantially the same intermediate frequency. The combined DAB/GPS signals are being IF selected in the filtering means 4, followed by an analog-to-digital conversion in the AD converter 5. The demodulation of DAB signals in the DAB demodulator 7 from this combined DAB/GPS signal at the output of the AD converter 5 is hardly affected by the GPS signals, because of the signal energy of GPS signals are substantially smaller than the signal energy of DAB signals during the occurrence of all symbols but the Null symbols. The deconvolution of the GPS signals in the GPS signal processor 8 is not affected by the DAB signals because there is no correlation between the DAB and GPS signals. According to the invention, the demodulated DAB signal is encoded in an encoding circuit 13 and subtracted from the GPS signals in the GPS processor 8 to eliminate DAB signal components in the GPS signals processed in the GPS processor 8

FIG. 4 shows a DAB frame structure in a so-called mode I, comprising in a cyclic sequence, subsequently, a NULL symbol having zero or near zero level signal energy and non-zero level DAB data segments, including a PRS symbol providing for synchronization of the DAB signal demodulation, followed by a number of so-called FIC symbols and data carrying DAB symbols 1–71. For detailed information, reference is made to the above mentioned article "A Power-Efficient Single-Chip OFDM Demodulator and Channel Decoder for Multimedia Broadcasting" by Jos A. Huisken et al, published in IEEE Journal of Solid-State Circuits, Volume 33, No. 11, November 1998.

What is claimed is:

1. A receiver for receiving and processing positioning signals comprising means for receiving and processing audio signals, wherein said receiver further comprises:
   a series arrangement of a receiver front-end, a mixer stage, filtering means, and analog-to-digital converter means;
   a digital audio signal path and a digital positioning signal path;
   means for coupling an output from said series arrangement to said digital audio and digital positioning signal paths; and
   audio signal eliminating means for selectively eliminating audio signals from said digital positioning signal path, wherein the receiver is a Global Positioning System (GPS) receiver, and wherein the audio signals are Digital Audio Broadcast (DAB) signals,
   characterized in that said receiver further comprises a voltage-controlled oscillator for supplying a tuneable local oscillator signal to the mixer stage, said audio signal eliminating means comprising control means coupled to a DAB demodulator included in said digital audio signal path and providing a control signal to the voltage-controlled oscillator as well as to a switching device, said switching device being coupled between the analog-to-digital converter means and said digital audio and digital positioning signal paths, said control means tuning the receiver to receive GPS signals and, simultaneously, controlling the switching device to disconnect the filtering means from the GPS signal path and to connect the filtering means to the DAB signal path at the occurrence of non-zero level DAB data segments.

2. A receiver for receiving and processing positioning signals comprising means for receiving and processing audio signals, wherein said receiver further comprises:
   a series arrangement of a receiver front-end, a mixer stage, filtering means, and analog-to-digital converter means;
   a digital audio signal path and a digital positioning signal path;
   means for coupling an output from said series arrangement to said digital audio and digital positioning signal paths; and
   audio signal eliminating means for selectively eliminating audio signals from said digital positioning signal path, wherein the receiver is a Global Positioning System (GPS) receiver, and wherein the audio signals are Digital Audio Broadcast (DAB) signals,
   characterized in that the receiver front-end comprises mutually separated DAB and GPS receiver front-ends, respectively coupled to a DAB mixer stage and a GPS mixer stage, outputs of these DAB and GPS mixer stages being coupled through, respectively, a DAB filtering device and a GPS filtering device, outputs from said filtering devices being coupled to an adder, and an output from the adder being coupled to said digital audio and digital positioning signal paths, said DAB and GPS mixer stages providing a frequency conversion of the DAB and GPS signals into mutually different frequency ranges.

3. The receiver as claimed in claim 2, characterized in that said receiver further comprises DAB channel selection means for selecting a DAB channel having a frequency range located beyond the frequency range of the GPS signals, said DAB channel selection means being controlled by a DAB channel selection control device.

4. The receiver as claimed in any one of claims 1–3, characterized in that said receiver further comprises various GPS correlators included in the GPS signal path, each of said GPS correlators comprising an integrate-and-dump circuit for DAB signal content controlled time multiplexed correlation of the GPS signals.

5. A receiver for receiving and processing positioning signals comprising means for receiving and processing audio signals, wherein said receiver further comprises:
- a series arrangement of a receiver front-end, a mixer stage, filtering means, and analog-to-digital converter means;
- a digital audio signal path and a digital positioning signal path;
- means for coupling an output from said series arrangement to said digital audio and digital positioning signal paths; and
- audio signal eliminating means for selectively eliminating audio signals from said digital positioning signal path, wherein the receiver is a Global Positioning System (GPS) receiver, and wherein the audio signals are Digital Audio Broadcast (DAB) signals,
- characterized in that said receiver further comprises various GPS correlators included in the GPS signal path, each of said GPS correlators comprising an integrate-and-dump circuit for DAB signal content controlled time multiplexed correlation of the GPS signals.

6. A receiver for receiving and processing positioning signals comprising means for receiving and processing audio signals, wherein said receiver further comprises:
- a series arrangement of a receiver front-end, a mixer stage, filtering means, and analog-to-digital converter means;
- a digital audio signal path and a digital positioning signal path;
- means for coupling an output from said series arrangement to said digital audio and digital positioning signal paths; and
- audio signal eliminating means for selectively eliminating audio signals from said digital positioning signal path, wherein the receiver is a Global Positioning System (GPS) receiver, wherein the audio signals are Digital Audio Broadcast (DAB) signals, and wherein said receiver further comprises signal replica means for generating received DAB signals from a decoded DAB signal, said digital audio signal eliminating means comprising compensation means for subtracting the regenerated DAB signal from the GPS signals in the GPS signal path,
- characterized in that said receiver further comprises various GPS correlators included in the GPS signal path, each of said GPS correlators comprising an integrate-and-dump circuit for DAB signal content controlled time multiplexed correlation of the GPS signals.

* * * * *